(12) United States Patent
Lahr et al.

(10) Patent No.: US 8,683,350 B2
(45) Date of Patent: Mar. 25, 2014

(54) SYSTEM AND METHOD FOR USING A WEBSITE CONTAINING VIDEO PLAYLISTS AS INPUT TO A DOWNLOAD MANAGER

(75) Inventors: Nils B. Lahr, Redmond, WA (US); Garrick Barr, Woodinville, WA (US)

(73) Assignee: Synergy Sports Technology, LLC, Tempe, AZ (US)

( * ) Notice: Subject to any disclaimer, the term of this patent is extended or adjusted under 35 U.S.C. 154(b) by 0 days.

(21) Appl. No.: 13/315,162

(22) Filed: Dec. 8, 2011

(65) Prior Publication Data

US 2012/0150946 A1 Jun. 14, 2012

Related U.S. Application Data

(63) Continuation of application No. 12/180,413, filed on Jul. 25, 2008, now abandoned.

(60) Provisional application No. 60/952,514, filed on Jul. 27, 2007, provisional application No. 60/952,528, filed on Jul. 27, 2007.

(51) Int. Cl.
*G06F 3/00* (2006.01)
*G06F 15/16* (2006.01)

(52) U.S. Cl.
USPC ........... 715/748; 715/719; 715/733; 715/810; 707/705; 707/736; 707/783; 709/200; 709/217; 709/231

(58) Field of Classification Search
USPC ......... 715/716, 719, 733, 748, 749, 760, 764, 715/765, 780, 781, 783, 609, 705, 736, 805, 715/810; 707/609, 705, 736, 805, 783; 709/200, 203, 229, 231, 201, 217, 219
See application file for complete search history.

(56) References Cited

U.S. PATENT DOCUMENTS

| | | | |
|---|---|---|---|
| 7,716,732 B2* | 5/2010 | Dodson et al. | 726/17 |
| 7,752,546 B2* | 7/2010 | Mannheimer et al. | 715/716 |
| 2004/0003389 A1* | 1/2004 | Reynar et al. | 717/178 |
| 2004/0056879 A1* | 3/2004 | Erdelyi | 345/716 |
| 2004/0201604 A1 | 10/2004 | Kraenzel et al. | |
| 2005/0132083 A1 | 6/2005 | Raciborski | |
| 2006/0031785 A1 | 2/2006 | Raciborski | |
| 2006/0080702 A1 | 4/2006 | Diez et al. | |
| 2006/0259589 A1* | 11/2006 | Lerman et al. | 709/219 |
| 2007/0011093 A1* | 1/2007 | Tree | 705/40 |
| 2007/0100787 A1 | 5/2007 | Lim et al. | |
| 2010/0005527 A1* | 1/2010 | Jeon | 726/22 |
| 2010/0100945 A1* | 4/2010 | Ozzie et al. | 726/5 |
| 2010/0248823 A1* | 9/2010 | Smith | 463/29 |

\* cited by examiner

*Primary Examiner* — Xiomar L Bautista
(74) *Attorney, Agent, or Firm* — Foster Pepper PLLC; Richard T. Black; P. G. Scott Born

(57) ABSTRACT

Systems and methods for enabling the download of a set of media files with a specific order and specific contents and, more particularly, to enabling a download manager to automatically receive the information it requires to retrieve those elements required to replicate a streaming edit through local playback after the downloads complete.

20 Claims, 8 Drawing Sheets

US 8,683,350 B2

SYSTEM AND METHOD FOR USING A WEBSITE CONTAINING VIDEO PLAYLISTS AS INPUT TO A DOWNLOAD MANAGER

CROSS REFERENCES TO RELATED APPLICATIONS

This application is a continuation U.S. patent application Ser. No. 12/180,413 which claims priority to U.S. Provisional Application Nos. 60/952,514 filed Jul. 27, 2007 and 60/952,528 filed Jul. 27, 2007. All of the foregoing applications are incorporated by reference herein in their entirety.

FIELD OF THE INVENTION

The field relates to accessing video playlists and other files located on websites.

BACKGROUND OF THE INVENTION

Viewing website content with current browsers requires a local application with an embedded web browser. There are many problems with these approaches. Local applications embedded in web browsers restrict the user to employ only the functions implemented by the local application. Users then invest a lot of time tweaking their web browser with multiple plug-ins, skins, hotkeys and other functions. Many website visitors also have strong preferences between Microsoft Internet Explorer, Firefox-Mozilla and other available browsers, becoming comfortable with how a given browser functions, its quirks, what works and what doesn't. By forcing the user into an embedded browser application, the user is dislodged from their comfortable operating environment and forces them to master a user-perceived inefficient downloading process.

Embedded browsers add to the burden on application builders to re-implement many of the expected features which do not come with the embedded browser object, such as tool bars, status bars, tabbed browsing, print functions and nearly all functions found outside of a browsers main viewing area. Another issue with today's approaches is that the local application is required to be running when the playlists are utilizing local derived functions such as the local download manger component of the software.

Applications such as Apple's iTunes, RealMedia's Rhapsody, Yahoo's MusicMatch and Microsoft's Zune all enable passing information from a web page to their local applications and so require that a local application be running and the web pages be viewed within an embedded browser to enable additional functionality. In some cases they use content types, which are sent from a web server and matched against a client's list of programs that are responsible for handling the data being received from the server. These solutions are not ideal as they require that the link on the web page return a specific content-type, be mapped on the client matching and then launch the corresponding application. The local application is content-type specific and requires additional links to restore browser functionality. These additional links are burdensome for the user to read and clutter the webpage.

SUMMARY OF THE PARTICULAR EMBODIMENTS

Systems and methods for enabling the download of a set of media files with a specific order and specific contents and, more particularly, to enabling a download manager to automatically receive the information it requires to retrieve those elements required to replicate a streaming edit through local playback after the downloads complete.

BRIEF DESCRIPTION OF THE DRAWINGS

Embodiments of the present invention are described in detail below with reference to the following drawing.

DETAILED DESCRIPTION OF THE PARTICULAR EMBODIMENTS

Figure 1:
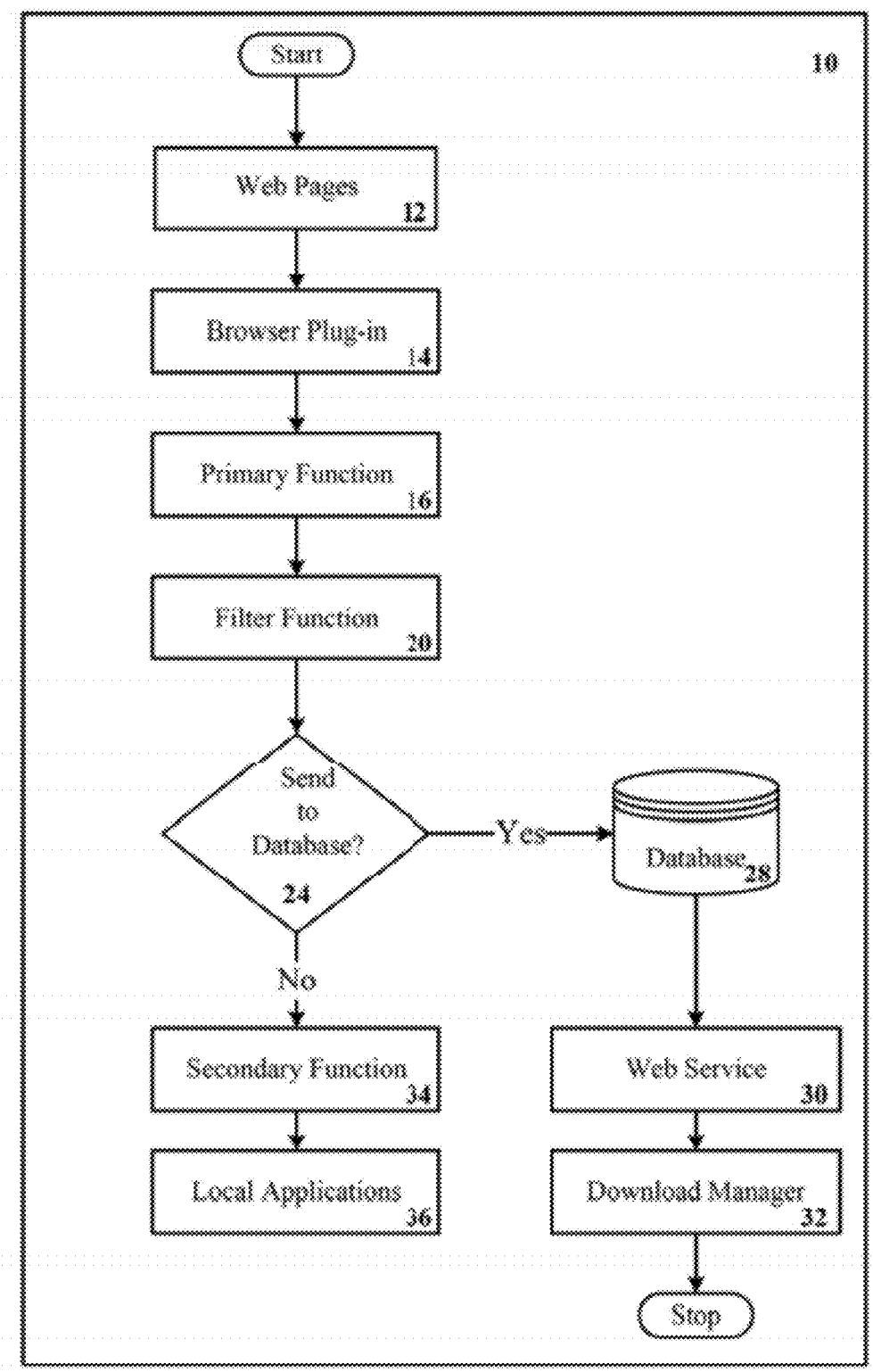
FIG. 1 schematically illustrates an algorithm to enable a web page to schedule downloads for a download manager.

In general, particular embodiments include systems and/or methods for downloading at least one set of media files with a specific order and specific contents and, more particularly, to enabling a download manager to automatically receive the information it requires to retrieve those elements required to replicate a streaming edit through local playback after the downloads are completed.

Disclosed herein are methods for downloading files from a website. The website may have links to playlists having multiple media files. The downloading method includes presenting a website that is viewable by a user, initializing a primary function selected by the user to override the security protocol of the viewed website, filtering the user-selected primary function, activating a secondary function to trigger events external to the website, and utilizing a download manager to obtain at least one video file, audio file, graphic file, image file, data file, and any metadata file relating to the video, audio, graphic, image, and data files. In alternate embodiments website presentation may include HTML Internet based modalities, but also Flash and Silverlight web-applications.

Disclosed also herein is a system for downloading files from a website. The files may include multiple media files and include video, audio, graphical, image, and data playlists, and metadata thereto. The downloading system includes a means for presenting a website that is viewable by a user, a means for initializing a primary function selected by the user to override the security protocol of the viewed website, a means for filtering the user-selected primary function, a means for activating a secondary function to trigger events external to the website, and a means for utilizing a download manager executable by a user's local computer to manage to obtain at least one video file, audio file, graphic file, image file, data file, and any metadata file relating to the video, audio, graphic, image, and data files.

Yet also disclosed herein is the means to the aforementioned system. The means includes computer executable medium having instructions to perform a method to download files from a website. The website may have links to playlists having multiple media files described above. The instructions from the computer executable medium include presenting a website that is viewable by a user, initializing a primary function selected by the user to override the security protocol of the viewed website, filtering the user-selected primary function, activating a secondary function to trigger events external to the website, and utilizing a download manager to manage to obtain at least one video file, audio file, graphic file, image file, data file, and any metadata file relating to the video, audio, graphic, image, and data files.

Alternate embodiments of the method described above concern utilizing a web browser to view a Synergy Web Page that provides an application to locally run on a user's computer. The locally running application advantageously provides for faster loading, optimum battery usage for portable devices and requiring less memory usage. The locally running application, denoted as a Synergy Download Manager described below, provides the ability to navigate to other web pages and to overcome the clutter of listing web page links to launch downloading procedures to obtain web page listed files. The Synergy Download Manager enables reviewing media, typically streaming over the Internet, through playlists and to provide the user with the option to download elements, subsets, or the entire playlist. The Synergy Download Manager also retains the ability of the user to utilize a web browser's content-type architectures and to engage in tabbed browsing, opening links in new windows, printing, adding favorites within your computers favorites lists and overall utilizing the full complement offered by the graphical user interface (GUI), including the GUI's graphics and buttons for simple tasks such as refresh, navigate backwards and navigate forwards.

Alternate embodiments relates to a system which presents statistical data collected from events within a video feed, such as a sports event, in a table and where each value is a link allowing the user to view a subset or entire set of video which contains the events which are responsible for generating the stat selected. Either the playlist and meta-data, the link itself or the resulting view, which presents the user with information about the video and/or an embedded player which plays the video selected, is transferred to a download management system which can then utilize this information to schedule transferring the video and meta-data from one location to another.

In accordance with other embodiments, there is provided one or more web pages, a browser add-in component, a primary function called by the add-in component, a system for passing data from the primary function to either a storage system for later retrieval or directly to another secondary function. Prior to passing the data between components, an optional filter function can be called which, for example, can enable the user to select options that would then add or remove from the data being passed between each component. Lastly there is provided a local application that can read final data generated as input for systems such as a download manager. Embodiments described herein overcome many limitations of current browsers that do not support open access to any local resources such as memory or disk, nor do they allow executing a local program. However current browsers do enable the user to register local add-on functions. For example, with Internet Explorer, it is possible to add a menu item to the right-click menu that pops up when a user right-clicks on a link within a web page. By registering such an add-on component it is possible to call a locally stored primary function. Such a function can be a local application, such as Visual Basic or JavaScript, or a local binary executable. When an add-in is activated by the user, for example clicking on the add-in's right-click menu item, the primary function is called and one of the parameters generated is the value of the link the user right-clicked. This value is only a single string value and it cannot exceed the HTML URL (hypertext mark-up language uniform resource locater) length as specified in RFC 2397, a URL scheme that works with immediate addresses that allows inclusion of small data items as "immediate data", as if it had been included from external sources. Because the length and data type of this value is restricted it cannot contain an entire playlist or any associated meta-data. Once the local function is executed, the parameters are sent to another system which can be within the same function, to an external data storage system, such as a database, to a secondary function with all or part of the original parameters. Prior to or triggered by the sending of this data to such a system, it is possible to provide the user with options which could then be included as a means of adding more user specific data in conjunction with the data provided from the web page. One example of this might be to request from the user a maximum number of media elements to be considered as some playlists can be very long. After this data transfer, a connection is made, either right away or at a later time, to a system which can convert the saved parameter (s) into a response containing a larger set of data, such as the playlist, meta-data and other associated files the local system needs to perform other functions. Portions of this data are then sent to a download management system which is responsible for downloading the requested media files. When all downloads are complete, the manager can utilize all of the local files as well as any received meta-data to enable local-only viewing the media and associated data.

The present application is related to U.S. Patent Publication No. 20070124788, published Jun. 15, 2007, for APPLIANCE AND METHOD FOR CLIENT-SIDED SYNCHRONIZATION OF AUDIO/VIDEO CONTENT AND EXTERNAL DATA, by Wittkoter; Erland, herein incorporated by reference in its entirety.

Playlists contain lists of pointers to media, such as audio or video files, and are typically used by applications to group such files together by categories such as albums, custom favorites and search results. Playlists are used within websites which have embedded media players, such as the Microsoft Windows Media Player, to queue up a list of files to playback. These interfaces typically provide the user with controls such as skipping an element in the list, viewing all of the elements in a text list, view details on the currently playing media element and enabling other interactive functions such as delete a clip, add a clip and a rate clip. Playlists are used within computer applications to achieve the same features as they are used within a website, but local applications are able to parse the playlist and perform actions not available from a website due to security restrictions. One key example is that a local application can parse the playlist and download each of the media elements to the local disk drive, something a website is not allowed to do as it isn't allowed access to the disk for security reasons. This creates a problem when the desired user experience is to have a website pass information, such as a playlist, to an application running locally.

By embedding the browser control into a locally running application, it is possible to capture all user and web page events. This allows the local application to respond to mouse clicks, dynamically change content on a web page based on local preferences and re-route what happens when you click on a link within a web page. Thus when a user clicks on a link, such as "Download Playlist", the local application stops the embedded browser from handling this event and handles it within the application instead. Locally run applications can perform functions, such as writing to the local disk, which a website is not allowed to do for obvious security reasons. This means that when the local application handles events from the embedded browser, it is possible to trigger actions that would otherwise be substantially difficult from a web page.

The described methods above also provide for a computerized method for downloading files from a website. The computerized methods provide computer executable instructions for presenting a website that is viewable by a user, initializing a primary function selected by the user to override the security protocol of the viewed website, filtering the user-selected primary function, activating a secondary function to trigger events external to the website, and utilizing a download manager to manage to obtain at least one video file, audio file, graphic file, image file, data file, and any metadata file relating to the video, audio, graphic, image, and data files. In yet other alternate embodiments, the website presentation may include HTML Internet based modalities, but also Flash and Silverlight web-applications.

The described methods also include computer readable media having instructions to perform computerized methods to download files from a website described above. The computer readable media may include the computer executable instructions memorialized or stored in Compact Disk Read Only Memory (CD-ROM) media, Digital Video Disks (DVD) media, Flash memory media, and in magnetic based media located within internal and/or external hard drives operable by local and/or remote computer systems. The systems utilized by the methods described above and below may include standalone computer systems capable of connecting with a local network or a wide area network, including the Internet. The standalone computer systems may be online and in communication with other standalone computer systems, directly, or via a server, in any local or wide area network, including the Internet. Yet other embodiments for the computerized methods to download files may be conveyed electronically from one computer system to another computer system, including directly from the described computer readable media to remote computers on a local or wide area network, including the Internet.

FIG. 1 schematically illustrates a download algorithm 10 to enable a web page to schedule downloads for a download manager. Algorithm 10 begins with a user visiting a webpage 12 and to then procure a browser plug-in 14 to then enable the primary function 16 that is selected based on how the browser plug-in 14 is registered with the local web browser. The primary function 16 may be engaged by right-clicking a computer point device or mouse on a link within the viewed webpage. The primary function 16 takes parameters from the browser plug-in 14 which are typically limited in size and can contain only information about the link on the webpage. This information is often not enough to carry entire playlists and/or associated metadata. The primary function 16 can manipulate the input parameters and call a filter function 20. Alternatively, the filter function 20 can be called at almost any stage within algorithm 10 but is shown as depicted after the primary function 16 as this is a typical implementation. The filter function 20 can then add, delete and modify the parameters through code execution or by presenting the user with a graphical interface for making additional modifications. Once the filter function 20 is finished algorithm 10 proceeds to decision diamond 24 with the query "Send to Database"? If positive, files are store in the database 28. If negative, a secondary function 34 is implemented. The secondary function 34 receives the resulting data from either the database 28 or directly from the filter function 20. The secondary function 34 can provide further manipulation on the data. A local application 36 is either supplied the data directly from the secondary function 34 or if it is possible the secondary function 34 places the data back into the database 28. At any time within algorithm 10 during or beyond the primary function 16 component, it is possible to utilize the available data as input to a web service 30 downstream from the database 28 that can return the full data set necessary for further operations. The local application 36 calls the web service 30 that can use the initial data, which is limited in length, to return as much data is necessary for the download manager 32 to perform its duties.

Figure 2:
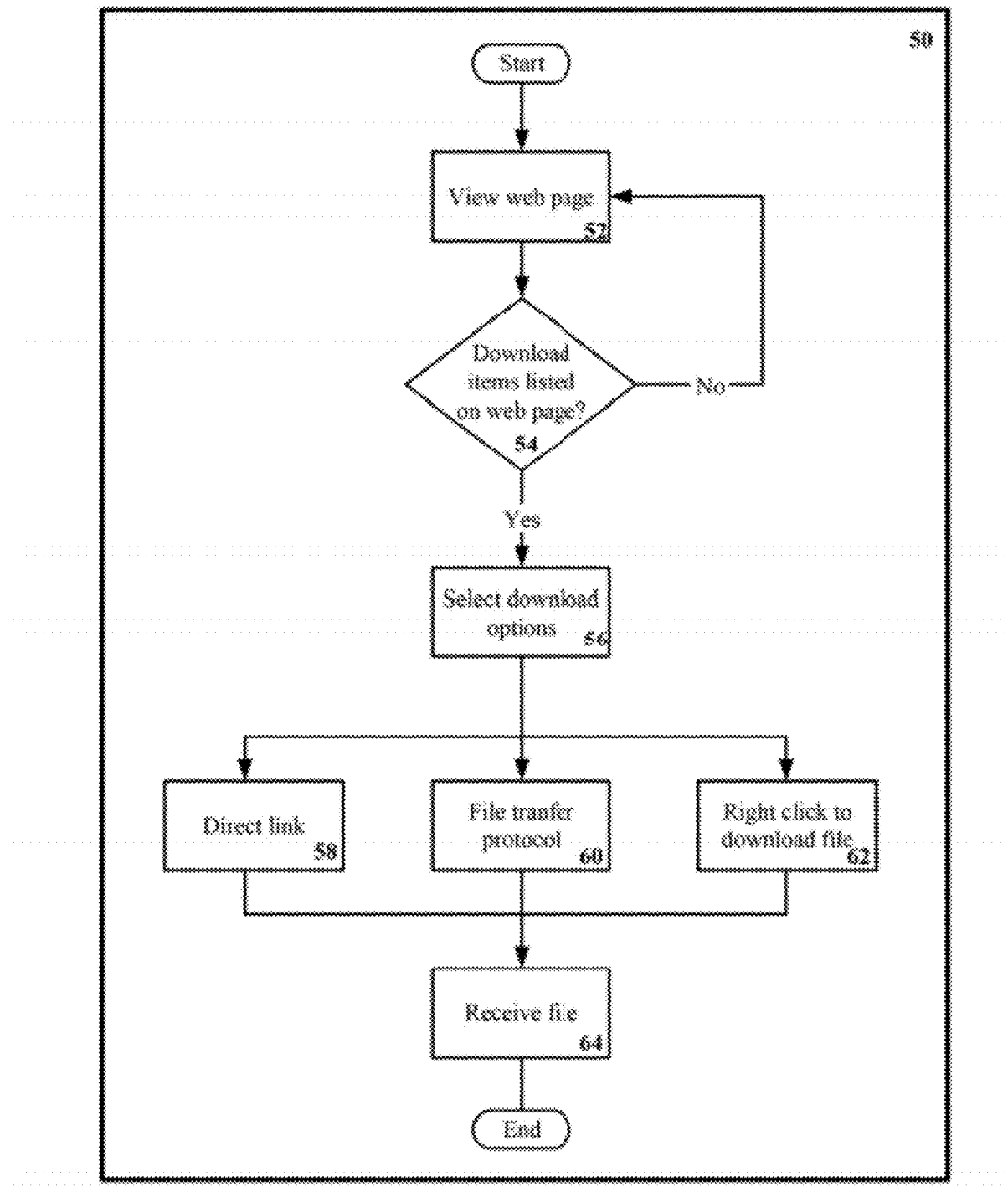
FIG. 2 schematically illustrates an algorithm to download files by multiple options.

FIG. 2 schematically illustrates an algorithm 50 to download files by multiple options. Beginning with process block 52, a user views a webpage and subsequently seeks an answer to the query presented in decision diamond 54 "Download items listed on webpage"? If negative, algorithm 50 re-routes to block 52. If affirmative, at process block 56 the user selects down load options, consisting of direct link in block 58, a file transfer protocol (FTP) in block 60, and a computer pointer or mouse-based Right Click to Download action in block 62. After the user selection the download option, algorithm 50 is completed when a file is received in process block 64.

Figure 3:
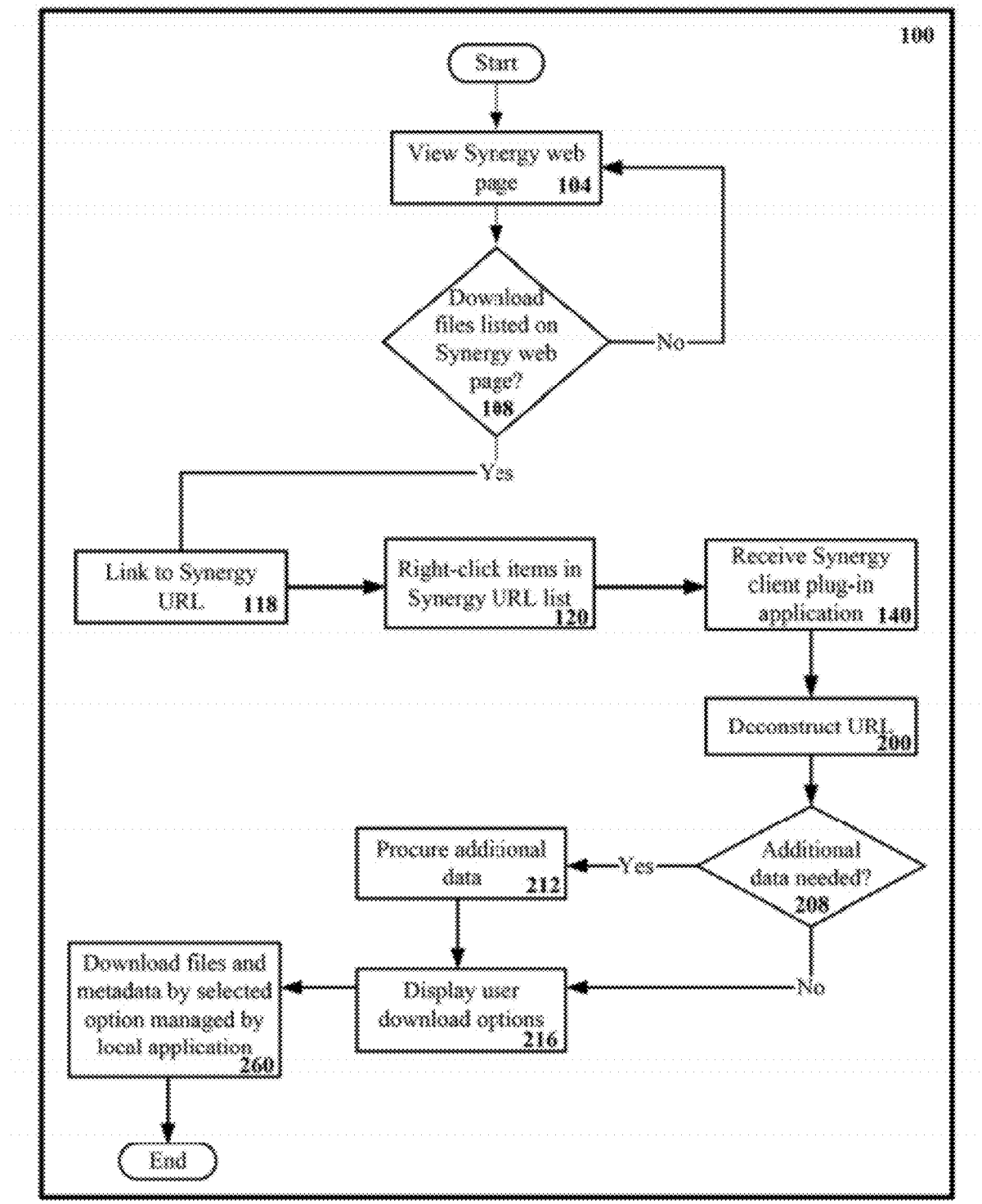
FIG. 3 schematically illustrates a Synergy Download Algorithm to download files by multiple options.

FIG. 3 schematically illustrates a Synergy Download Algorithm 100 to download files by multiple options in an efficient manner. Beginning with process block 104, a user views a Synergy webpage and subsequently seeks an answer to the query presented in decision diamond 108 "Download items listed on Synergy webpage"? If negative, algorithm 100 re-routes to block 52. If affirmative, at process block 118 the user links to a Synergy URL, then subsequently Right-clicks with the mouse or computer pointer for a particular item in the synergy URL list in process block 120. Thereafter, at process block 140. The client receives the Synergy Plug-In Application into the user's browser. In alternate embodiments, the Synergy Plug-in may be in the form of providing computer executable instructions to modify Internet. Explorer's right-click menu function via modifying the Windows Registry. The menu-item that was right-clicked calls a locally installed application and passes the URL that was right-clicked within the HTML, Flash, or Silverlight web pages. Thereafter, the Synergy URL is deconstructed at process block 200 and the user, in decion diamond 208, determines an answer to the query "Additional data needed"? If affirmative, Synergy download algorithm 100 proceeds to process block 212 to procure additional data. If negative, display options for downloading are presented to the user at process block 216. A download option is selected by the user in process block 260 and files are downloaded with any accompanying metadata to complete the Synergy Download Algorithm 100.

Figure 4:
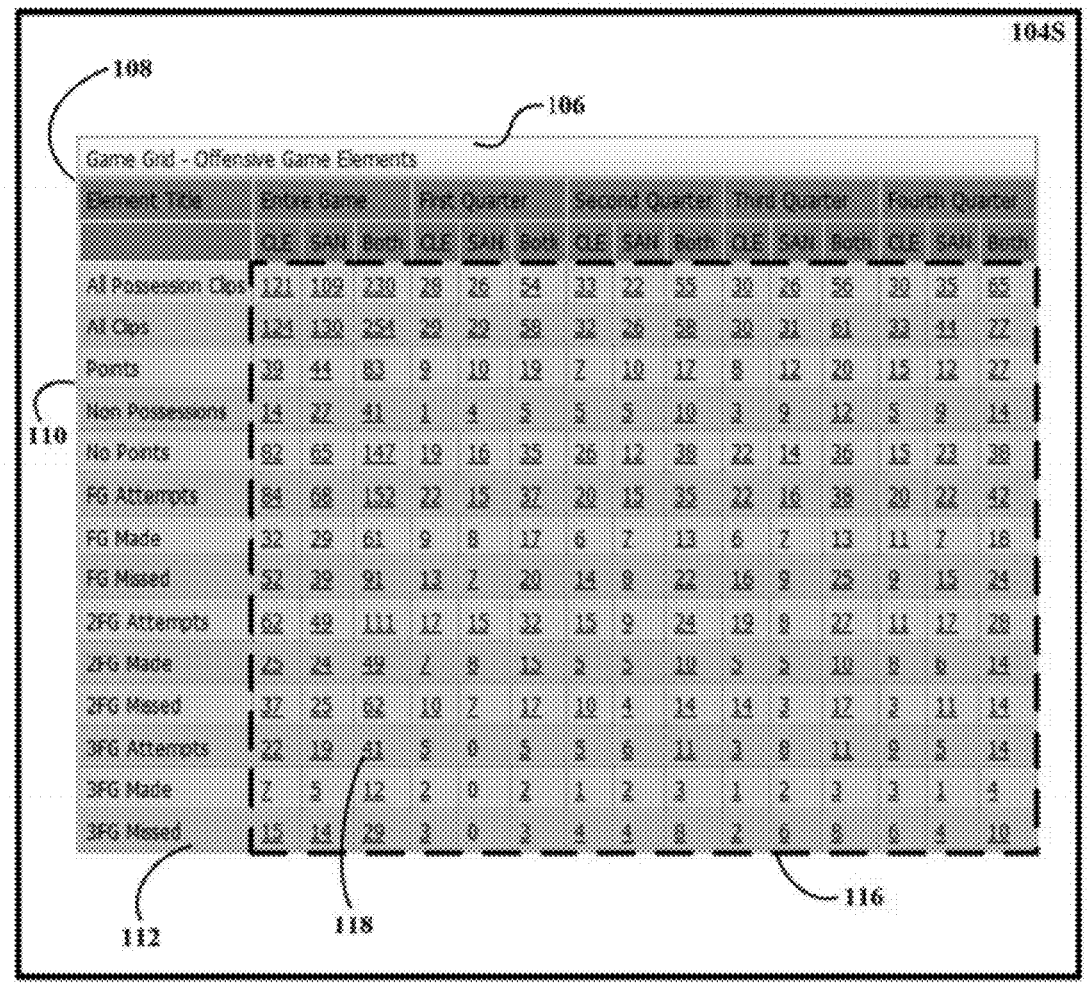
FIG. 4 schematically illustrates a portion of a screenshot depicting elements of a game statistics grid.

FIG. 4 schematically illustrates a portion of a screenshot 104S depicting elements of a game statistics grid 106 having information related to offensive game elements. The grid includes element title, entire game, first quarter, second quarter, third quarter, and fourth quarter. Each quarter is subdivided into CLE, SAN, and both categories. The element titles include all possession clips to missed field goals with statistics. Stats grid above containing links. Each link, when left-clicked will lead user to another page with information about that stat that was clicked. In this application it leads to a web based media player which plays the video associated with the link.

More particularly, the game elements are classified into sub-groups in heading rows 108 as Element Title, Entire Game, First Quarter-Forth Quarter, each Quarter further dived into CLE, SAN, and Both data sets. The element title 108 is sub-classified into column sub-categories 112 from "All possession Clips" to first, second, and third quarter Missed field goals (3FG missed). A statistics table or grid 116 or table, designated is defined by row 108 and column 112, is composed of an array of cells 118, each cell of the grid 116 having underlined numerals reflective of the number of files available for downloading by the Synergy Download Algorithm 100. In this webpage example, the statistical table 116 provides each cell 118 with sports related statistics within the table 116 and may be linked to new web pages containing information about a particular sport statistic, without having to provide a secondary link to be displayed next to every statistic.

Though this grid 116 has sports related files in the cell 118 available for Synergy downloading, the cells 118 in the grid 116 could also represent the number of digital media files available for downloading, including digital video files and music files. Other files in the cell 118 could be graphic files, digital picture files, or any data file amenable for digital downloading.

Figure 5:
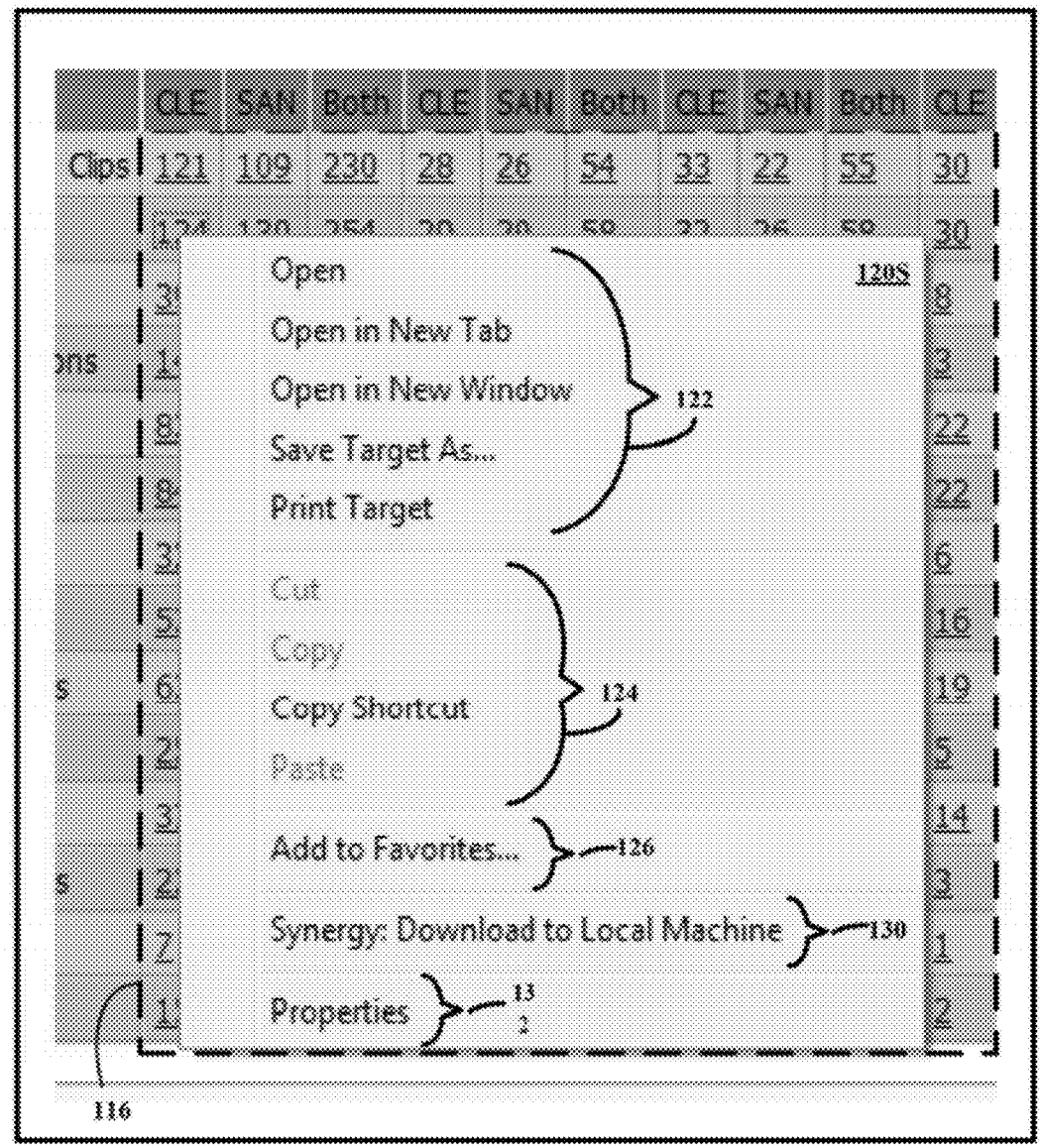
FIG. 5 schematically illustrates a portion of a screenshot showing a Synergy menu box for downloading files of information presented in FIG. 4.

FIG. 5 schematically illustrates a portion of a screenshot showing a Synergy menu box 120S for overlapping a portion of the grid 116. Depicted is a menu box to edit downloadable directory file information from the website. The primary function can change the input parameters as well as call a new program that can allow the user to filter and/or modify various data elements. Above is an example mini-program which allows the user to specify a directory name, description, limit the number of clips and specify a viewing order. This program then passes the data to a local database and/or to a secondary function.

More particularly, the Synergy menu box 120S has four options for assisting downloading files of information presented in the cells 118 of the grid 116. The four options include a normal Windows® options 122 having Open, Open in New Tab, Open in New Window, Save Target As, and Print Target. A second option includes function group 124 having Cut, Copy, Copy Shortcut, and Paste. A third option 126 includes Add to Favorites. The fourth option 130 is the Synergy Plug-In to Local Machine. The Synergy Plug-In 130 is an application downloaded to the user's central processing unit (CPU) that works from the CPU to assist in downloading the files from a given cell 118. Properties 132 provide information on file sizes. After registering a new right-click function with Internet Explorer, by right clicking on a link, as shown above, the "Synergy: Download to Local Machine" menu option 130. This calls a local primary function as specified during the registration of the new menu item.

Figure 6:
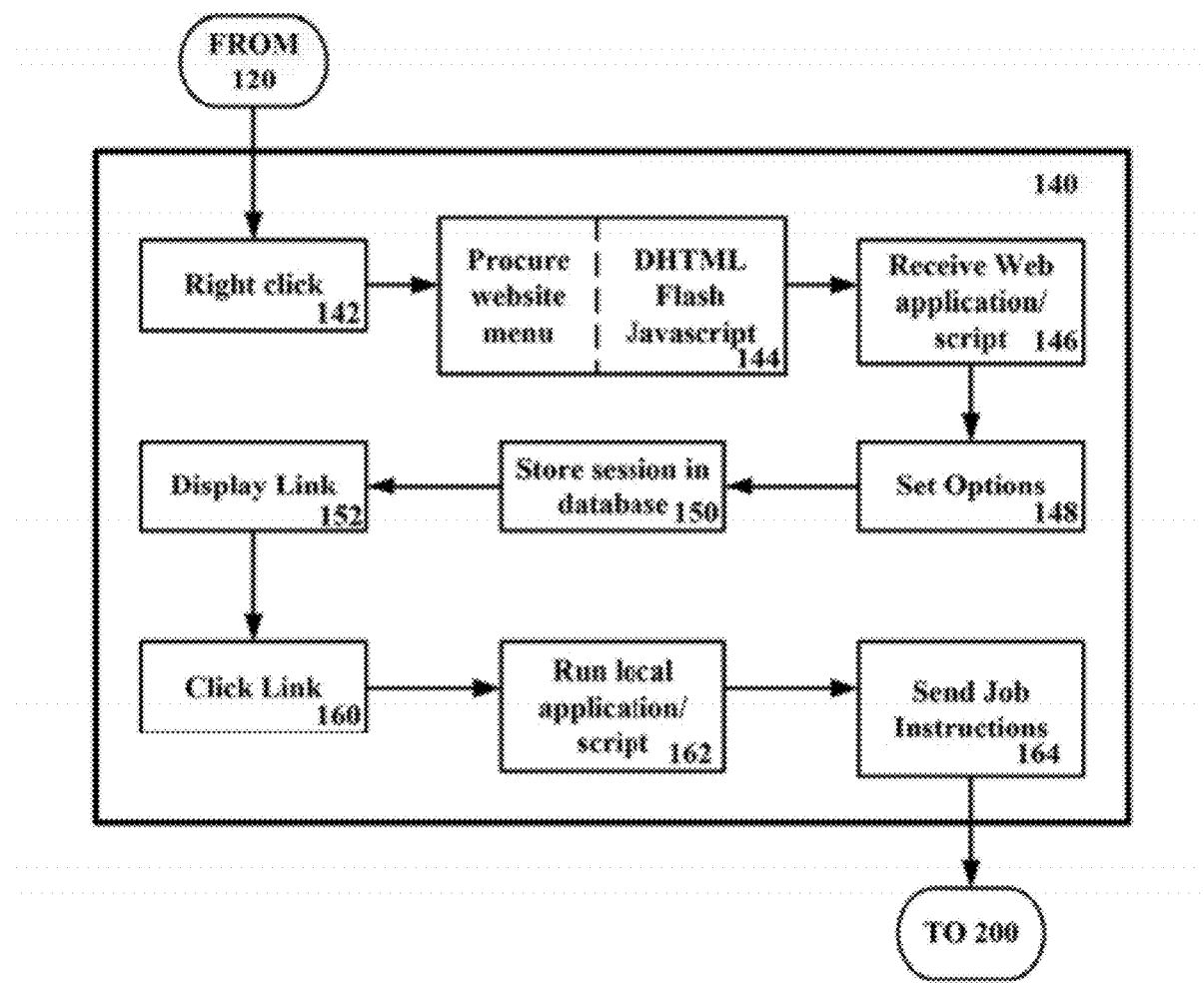
FIG. 6 schematically illustrates an expansion of the server side of the Receive Synergy Client Plug-In Application sub-algorithm 140 of FIG. 3.

FIG. 6 schematically illustrates an expansion of the server side of the Receive Synergy Client Plug-In Application sub-algorithm 140 of FIG. 3. In general terms sub-algorithm 140 concerns engaging a computer pointing device to procure a website menu. The website menu may include active DHTML, FLASH, and Javascript menus. Thereafter, upon receiving a web application script, options for downloading are set, sessions are stored in a database, file links are displayed, the download manager operating from the user's local computer is engaged upon the file link to start the run, and a file or files associated with the file link are retrieved and stored on the user's local computer.

More particularly, the server side of sub-algorithm 140 begins by entering from process block 120, wherein the user Right Clicks the mouse in process block 142. Alternatively, the user may Left Click and Hold, or CTRL key and Left Click. Thereafter, at process block 144, a Website Menu appears that may be in the form of a Java Script, a dynamic hypertext mark-up language (DHTML), or a Flash file that provides rollover buttons or drop down menus on a webpage. Sub-algorithm 140 continues to process block 146 to receive the Web application script, followed by block 148 set Options. Thereafter, the Session is stored in a database at process block 150, then linked to Session at process block 152 whereby a display link is offered to the user. Alternatively, the Set options block may route directly to display link at process block 152. The user then clicks the displayed link with the mouse at process block 160, and a Run Local Application is begun at process block 162. The server side of sub-algorithm 140 is then completed by process block 164 where the job is sent and exits to process block 200.

Figure 7:
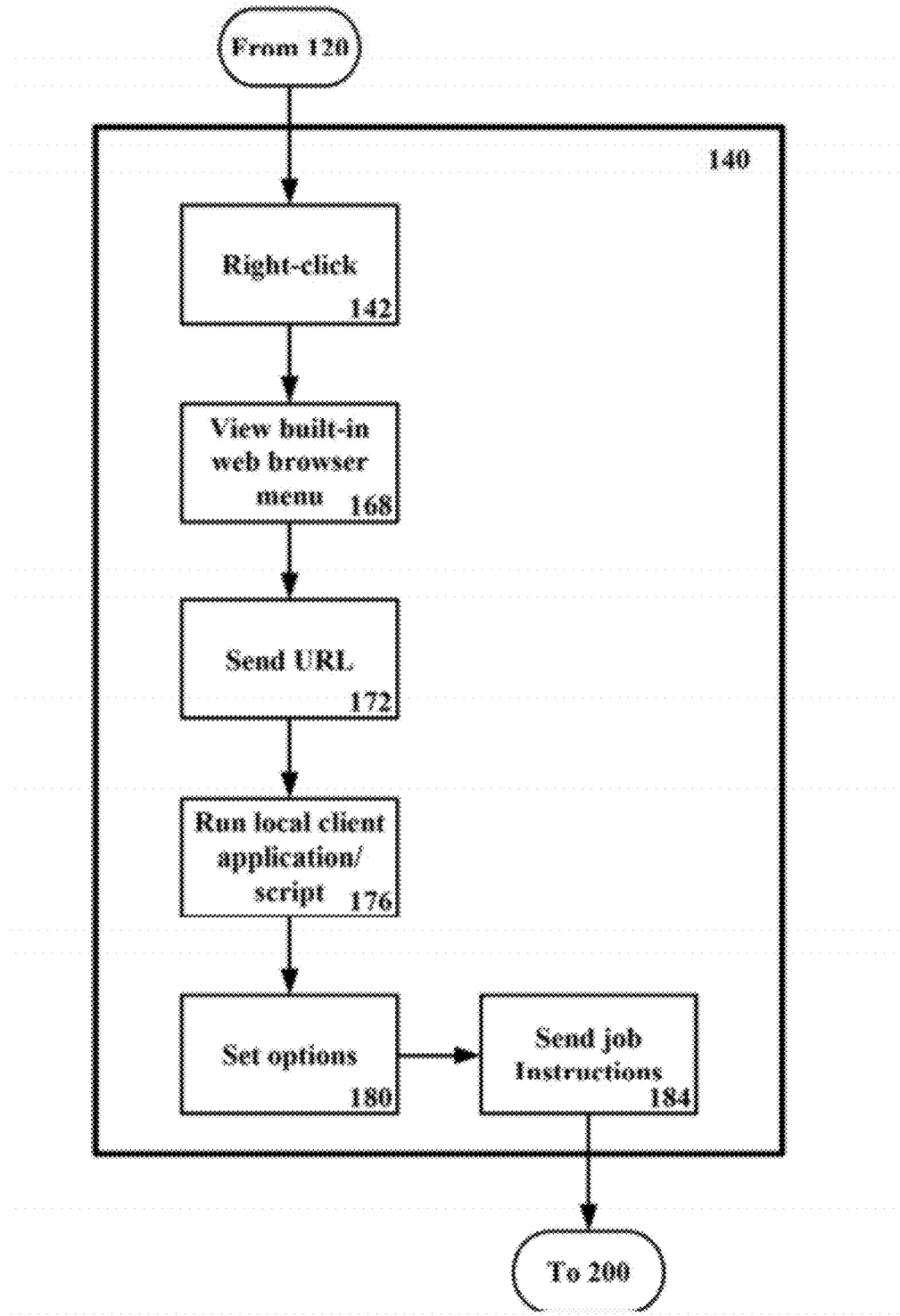
FIG. 7 schematically illustrates an expansion of the client side of the Receive Synergy Client Plug-In application sub-algorithm 140 of FIG. 3.

FIG. 7 schematically illustrates an expansion of the client side or local computer user's side Of the Receive Synergy Client Plug-In application sub-algorithm 140 illustrated in FIG. 3. In general terms sub-algorithm 140 concerns engaging a computer pointing device to procure a website built-in browser menu, sending a universal resource locator (URL), running the download managers from the user's local computer, setting download options, and sending job instructions for storing the file on the user's local computer. In alternate embodiments, the right clicking interaction of the mouse pointer in the menu presented by Internet Explorer may be modified to accommodate DHTML based pages and maintain the other command options, including Save as, and Print. The right clicking option for DHTML based pages may be added during software loading of client-side installation procedures overseen by the Synergy Download Manager that adds the menu items into Internet Explorer through modifying the menu within the Windows Registry.

More particularly, the client side or computer user's side of sub-algorithm 140 begins by entering from process block 120, wherein the user right clicks the mouse at process block 142, and a built-in Web Browser Menu appears in process block 168. Next, at process block 172, a Synergy URL is sent to the user's monitor. Right-clicking a link via the client side handler of an event is passed when the URL is clicked upon so that all necessary information is passed on via the parameters of the URL. The information transferred may be un-encrypted so that all transferred information may be visible. In alternate embodiments, the information being transferred may be encrypted so that a given variable and/or variable combinations or a URL argument remain unseen or unintelligible to other viewers and discourage and prevent re-usage by those who may have access to the same link. Encryptions allows more sophisticated data with the URL's argument, such as XML, and other more complex structures, to be stored. Thereafter, at process block 176, the Synergy Plug-In 130 is run on the local machine as a local computer machine executable application. Options sets are presented to the user at process block 180. The client side of sub-algorithm 140 is then completed by process block 180 where the job is sent and exits to process block 200.

Figure 8:
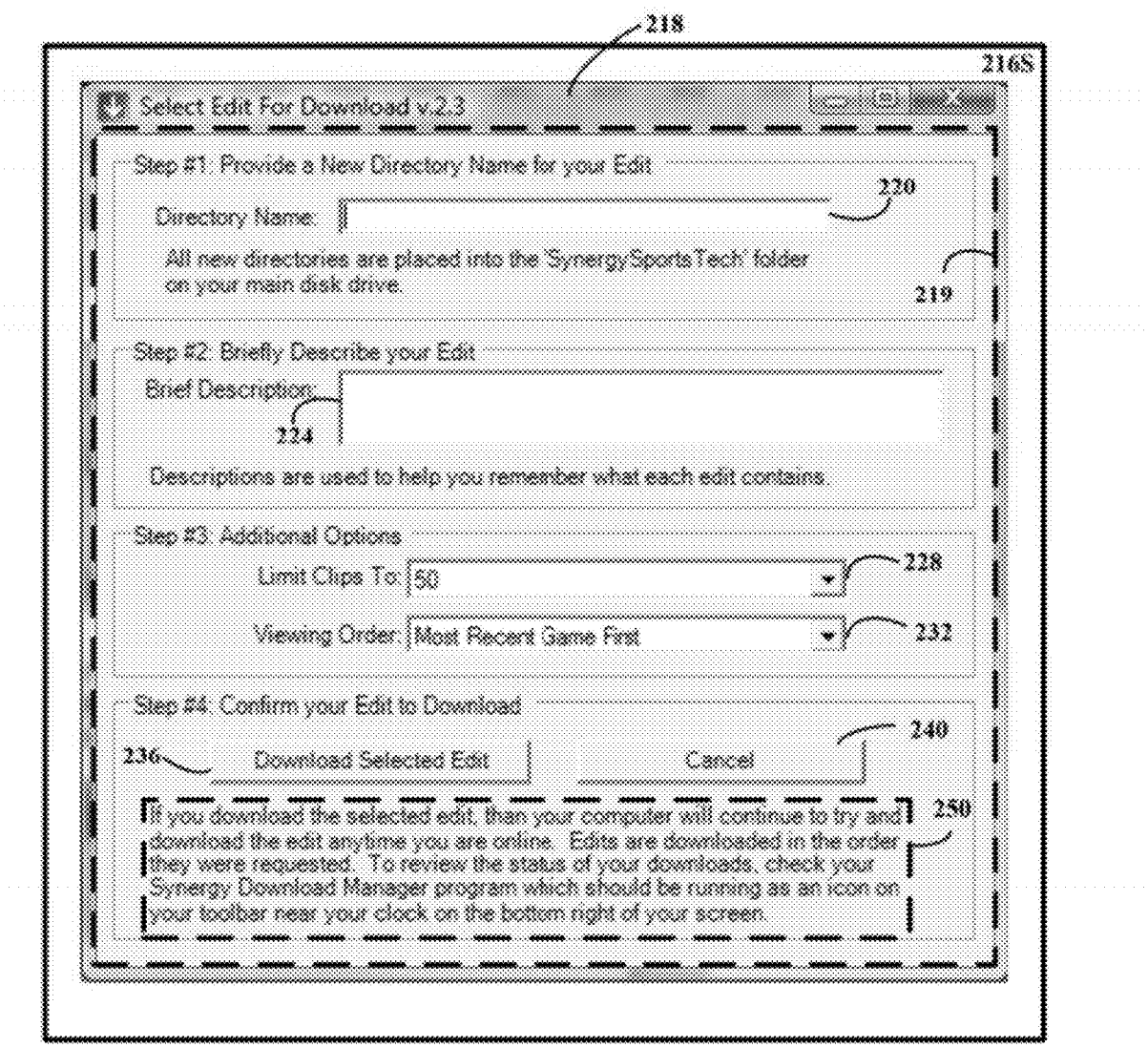
FIG. 8 depicts a menu box to edit downloadable directory file information from a website to a Synergy Sports Technology folder.

FIG. 8 depicts a menu box to edit downloadable directory file information from a website to a Synergy Sports Technology folder. In general term the menu box has information related to the retrieving of a file associated with the file links selectable by a file list or those retrievable from cell 118 of grid 116 illustrated in FIG. 3 above. The information relating to file retrieval and job instructions for downloading of same includes interaction with a webpage having instructions for the user to designate a directory name, a brief description of the file being retrieved, declaring a numerical value of media clips to designate for storage, declaring the viewing order of the media clips, and commands to initiate file download to the user's local computer.

Depicted in screenshot of a webpage 216S beneath bar 218 titled "Select Edit for Download v.2.3" a menu box 219 having four steps allowing a user to specify a directory name for editing 220, a description of the edit 214, additional options to limit the number of clips 228 and specify a viewing order 232 to edit downloadable directory file information from the website, and a confirmation to edit to download having a download selected edit button 236 and cancel button 240. The primary function can change the input parameters as well as call a new program that can allow the user to filter and/or modify various data elements. An information box 250 informs the user "If you download the selected edit, then your computer will continue to try and download the edit anytime you are online. Edits are downloaded in the order they were requested. To review the status of your downloads, check your Synergy Download Manager program which should be running as an icon on your toolbar near your clock on the bottom right of your screen". This program then passes the data to a local database and/or to a secondary function.

The systems and methods illustrated in the figures and described above advantageously provide for using a website containing video playlists as input to a download manager for allowing a user to easily manage downloading groups of video files and associated meta-data to a local disk maintaining the same order presented if viewed within the website, comprising a new attribute 1 web page, for displaying data as a web page to the user; a browser add-in, for enabling the user to activate the primary function from within a web browser; a primary function, for initializing the user selected action as a locally called function enabling the breakout of the web browser security restrictions; a filter function, for allowing a programmatic or user interactive method of changing the parameters passed to the primary function prior to use by other components; a database, for storing the data generated from the primary and/or filter functions; a secondary function, for further parameter manipulation as well as triggering external program or events; a local application, for receiving the data and sending it along to sub components, such as a download manager; a web service, for resolving a limited set of data, such as data parameters, into a large set of data such as a playlist and/or associated meta-data; and a download manager, for scheduling downloads of files and/or associated meta-data.

While the particular embodiments have been illustrated and described for acquiring efficient downloading of sports-related files, other embodiments may include utilizing the Synergy technology adapted to acquire efficient downloading on, files other than sports related subject matter. For example, video files, image files, music and other audio files. Accordingly, the scope of the invention is not limited by the disclosure of the preferred embodiment. Instead, the invention should be determined entirely by reference to the claims that follow.

What is claimed is:

1. A method for downloading files from a website comprising:
   presenting a website viewable by a user;
   initializing a primary function selected by the user to override the security protocol of the website;
   filtering the user-selected primary function;
   activating a secondary function to invoke a download manager external to the website; and
   utilizing the download manager to obtain from the website and store to a memory device at least one video data file and video metadata file.

2. The method of claim 1, wherein presenting a website viewable by a user includes a webpage having a plug-in application executable by the user's local machine.

3. The method of claim 2, wherein presenting a website viewable by the user includes a webpage having a list of downloadable files.

4. The method of claim 3, wherein utilizing a download manager includes downloading the plug-in application executable by the local computer.

5. The method of claim 4, wherein utilizing the download manager includes selecting at least one file from the list via the download manager operating from the user's computer.

6. The method of claim 3, wherein presenting a website viewable by the user includes a webpage having a grid of downloadable files.

7. The method of claim 6, wherein utilizing the download manager includes selecting at least one file located in a cell of the grid via the download manager operating from the user's computer.

8. A computer executable medium having computerized instructions to perform a method for downloading files from a website comprising:
   presenting a website viewable by a user;
   initializing a primary function selected by the user to override the security protocol of the website;
   filtering the user-selected primary function;
   activating a secondary function to invoke a download manager external to the website; and
   utilizing the download manager to obtain from the website and store to a memory device at least one video data file and video metadata file.

9. The computer executable medium of claim 8, wherein presenting a website viewable by a user includes a webpage having a plug-in application executable by the user's local machine.

10. The computer executable medium of claim 9, wherein presenting a website viewable by the user includes a webpage having a list of downloadable files.

11. The computer executable medium of claim 10, wherein utilizing a download manager includes downloading the plug-in application executable by the local computer.

12. The computer executable medium of claim 11, wherein utilizing the download manager includes selecting at least one file from the list via the download manager operating from the user's computer.

13. The computer executable medium of claim 10, wherein presenting a website viewable by the user includes a webpage having a grid of downloadable files.

14. The computer executable medium of claim 13, wherein utilizing the download manager includes selecting at least one file located in a cell of the grid via the download manager operating from the user's computer.

15. A system for downloading files from a website comprising:
   a computer system configured to present a website viewable by a user;
   means for initializing a primary function selected by the user via the computer system to override the security protocol of the website;
   means for filtering the user-selected primary function via the computer system;
   means for activating a secondary function to invoke a download manager external to the website via the computer system; and means for utilizing the download manager via the computer system to obtain from the website and store to a memory device at least one video data file and video metadata file.

16. The system of claim 15, wherein the means for utilizing a download manager include computer executable instructions by a server.

17. The system of claim 16, wherein the server computer executable instructions include engaging a computer pointing device to procure a website menu, receiving a web application script, setting download option, storing a session in a database, displaying a file link, engaging the file link to run the download manager operating from the user's local computer, and retrieving a file associated with the file link, and storing the file on the user's local computer.

18. The system of claim 15, wherein the means for utilizing a download manager include computer executable instructions by a user's local computer.

19. The system of claim 18, wherein the user's local computer executable instructions include engaging a computer pointing device to procure a website built-in browser menu, sending a universal resource locator, running the download managers from the user's local computer, setting download options, and sending a job instruction for storing the file on the user's local computer.

20. The system of claim 18, wherein retrieving a file associated with the file link includes interaction with a webpage having instructions for the user to designate a directory name, a brief description of the file being retrieved, declaring a numerical value of media clips to designate for storage, declaring the viewing order of the media clips, and commands to initiate file download to the user's local computer.

* * * * *